(12) United States Patent
Hofer et al.

(10) Patent No.: US 9,669,879 B2
(45) Date of Patent: Jun. 6, 2017

(54) METHOD OF MANUFACTURING A VEHICLE AND VEHICLE

(71) Applicant: MAGNA STEYR Fahrzeugtechnik AG & Co KG, Graz (AT)

(72) Inventors: Bernhard Hofer, Graz (AT); Harald Zachnegger, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 14/817,237

(22) Filed: Aug. 4, 2015

(65) Prior Publication Data

US 2016/0039465 A1 Feb. 11, 2016

(30) Foreign Application Priority Data

Aug. 5, 2014 (EP) ..................... 14179894

(51) Int. Cl.

| | |
|---|---|
| *B62D 27/02* | (2006.01) |
| *B21J 15/02* | (2006.01) |
| *F16B 19/08* | (2006.01) |
| *F16B 5/04* | (2006.01) |
| *B62D 25/02* | (2006.01) |
| *F16B 19/00* | (2006.01) |
| *B21J 15/14* | (2006.01) |
| *F16B 19/04* | (2006.01) |

(52) U.S. Cl.
CPC ............ *B62D 27/02* (2013.01); *B21J 15/025* (2013.01); *B21J 15/147* (2013.01); *F16B 19/008* (2013.01); *F16B 19/086* (2013.01); *B62D 25/025* (2013.01); *F16B 5/04* (2013.01); *F16B 2019/045* (2013.01)

(58) Field of Classification Search
CPC .... F16B 5/04; F16B 19/008; F16B 2019/045; F16B 19/086; B62D 25/02; B62D 25/025; B62D 27/02; B21J 15/025; B21J 15/147
See application file for complete search history.

(56) References Cited

U.S. PATENT DOCUMENTS

2002/0172576 A1* 11/2002 Keener .................. F16B 19/06
411/504
2005/0089384 A1* 4/2005 Pratt ..................... F16B 39/225
411/82
(Continued)

FOREIGN PATENT DOCUMENTS

DE 102004004386 A1 8/2005
DE 102009031838 A1 1/2011
(Continued)

OTHER PUBLICATIONS

Budde L, "Mechanisches Fugen Von Blechwerkstoffen Entwicklungen Und Chancen", Tagung Warmearme Fugetechniken—Kleben et al. Jan. 1, 1993, pp. 9-23, Paderborn, Germany.

*Primary Examiner* — Gregory Blankenship
(74) *Attorney, Agent, or Firm* — Jordan IP Law, LLC; Todd A. Vaughn

(57) ABSTRACT

A method for manufacturing a motor vehicle, and to a correspondingly manufactured motor vehicle having a modular construction in which a substructure and further body modules of the motor vehicle are manufactured independently of one another and are subsequently permanently connected to one another.

14 Claims, 3 Drawing Sheets

(56) References Cited

U.S. PATENT DOCUMENTS

| | | | | |
|---|---|---|---|---|
| 2010/0221064 A1* | 9/2010 | West | ............... | F16B 43/001 403/288 |
| 2011/0057476 A1* | 3/2011 | Beck | ............... | B62D 25/02 296/181.2 |
| 2012/0168055 A1* | 7/2012 | Bray | ............... | F16B 1/0071 156/64 |
| 2012/0267917 A1* | 10/2012 | Weigl | ............... | B62D 25/20 296/193.07 |
| 2014/0328614 A1* | 11/2014 | Fleischheuer | ......... | B60N 2/682 403/267 |
| 2016/0039465 A1* | 2/2016 | Hofer | ............... | B62D 27/02 296/193.01 |

FOREIGN PATENT DOCUMENTS

| | | | |
|---|---|---|---|
| DE | 102009048398 | A1 | 4/2011 |
| EP | 0931944 | A2 | 7/1999 |
| EP | 1430989 | A1 | 6/2004 |
| JP | H09144725 | A | 6/1997 |

* cited by examiner

METHOD OF MANUFACTURING A VEHICLE AND VEHICLE

CROSS-REFERENCE TO RELATED APPLICATIONS

The present application claims priority 35 U.S.C. §119 to European Patent Publication No. EP 14179894.2 (filed on Aug. 5, 2014), which is hereby incorporated by reference in its entirety.

TECHNICAL FIELD

Embodiments relate to a method for manufacturing a motor vehicle, and to a correspondingly manufactured motor vehicle. In particular, the invention relates to motor vehicles which are manufactured in a modular construction, wherein a substructure and further body modules of the motor vehicle are manufactured independently of one another and are subsequently permanently connected to one another.

BACKGROUND

Methods of this type for manufacturing motor vehicles by way of modules are known per se. European Patent Publication No EP 2 463 181 A2 discloses a method for manufacturing a motor vehicle, in which preassembled modules are joined on an assembly line to form an entire vehicle. The modules are painted before the joining, and the assembly takes place by adhesively bonding and/or screwing on the modules.

In addition, the solid punch riveting method for connecting metallic components and also fibre composite components is known. Solid punch riveting is indeed used in the body shell, but only for unpainted metal sheets since, in the case of components which are already painted, leakages occur at the cut edge, and therefore, anticorrosion requirements cannot be met.

SUMMARY

Embodiments relate to a method for manufacturing a motor vehicle, which permits a high level of vehicle rigidity, and at the same time, an increase in the structural strength in the event of a crash, and ensures good corrosion protection.

Embodiments relate to a motor vehicle having increased structural strength.

In accordance with embodiments, a method for manufacturing a motor vehicle includes at least one of the following: producing a substructure and at least one body module of the motor vehicle, the substructure and the body module each having at least one flange region; painting at least the flange region of the substructure and/or of the body module; connecting the flange regions of substructure and body module by way of solid punch rivets, the solid punch rivets each having a head with an under head coating or an under head seal that bears against of or otherwise contacts the painted flange region of the substructure or the body module.

In accordance with embodiments, the substructure and body module can be manufactured independently of each other and are already painted (dip-painted) prior to the riveting. At least one of the flange regions is, or both flange regions are, painted, and, customarily, the components are painted in their entirety.

In accordance with embodiments, the term "substructure" used herein may, similarly to the body module, also involve a module or substructure module which can be understood as meaning a finished assembly of a structural unit. Equipment components can already be accommodated therein. The substructure is frequently a module which is equivalent in degree of construction to the body module; for example, the two, as mentioned above, can already be painted.

In accordance with embodiments, the under head coating or under head seal seals off the cut edge, which was produced by punching by way of the solid punch rivet, in the painted flange region. Possible damage to the paint in the head region is sealed, and therefore, the tightness and the corrosion protection, are ensured.

Because the manufacturing of a motor vehicle from modules have already been painted in advance, it is therefore made possible for said modules to be connected in a mechanically stable manner by solid punch rivets, and thus, to increase the structural strength. In particular, a stable connection can be produced between a wet-compartment-side structure, for example a metallic structure, and a dry-compartment-side structure, for example a fibre composite structure.

In accordance with embodiments, the under head coating comprises a thermoplastic under head coating. Solid punch rivets coated in such a manner are supplied, for example, by the company Kerb-Konus.

In accordance with embodiments, the solid punch rivets are set from a wet compartment side in the direction of a dry compartment side. The rivet head is then located on the wet compartment side which is therefore readily sealed off.

In accordance with embodiments, the under head seal can be formed by an annular seal encircling radially on the outside.

In accordance with embodiments, the seal preferably ends flush at the outside diameter of the head, at least before the setting. This permits an interference-free, automatic feeding in a setting appliance. The seal can be incorporated into a groove in the head.

In accordance with embodiments, the substructure and the body module are particularly preferably additionally connected by adhesive bonding and/or screwing for the solid punch riveting, in particular before the solid punch riveting, in order to achieve a particularly high level of structural strength and structural rigidity.

In accordance with embodiments, a motor vehicle comprises at least one of the following: a substructure and at least one body module, the substructure and the body module each having at least one flange region, wherein at least the flange region of the substructure and/or of the body module is painted, wherein the flange regions of substructure and body module are connected by way of solid punch rivets, wherein the solid punch rivets each have a head with an under head coating or under head seal, and therefore the under head coating or under head seal bears against the painted flange region of the substructure or of the body module.

In accordance with embodiments, the under head coating is preferably a thermoplastic under head coating. The solid punch rivets are preferably set from a wet compartment side in the direction of a dry compartment side. The under head seal can be formed by an annular seal encircling radially on the outside. The seal preferably ends flush at the outside diameter of the head, at least before the setting. The seal is preferably incorporated into a groove in the head. The substructure and the body module are preferably additionally connected by adhesive and/or screws.

DRAWINGS

Embodiments will be illustrated by way of example in the drawings and explained in the description below.

DESCRIPTION

Figure 1:
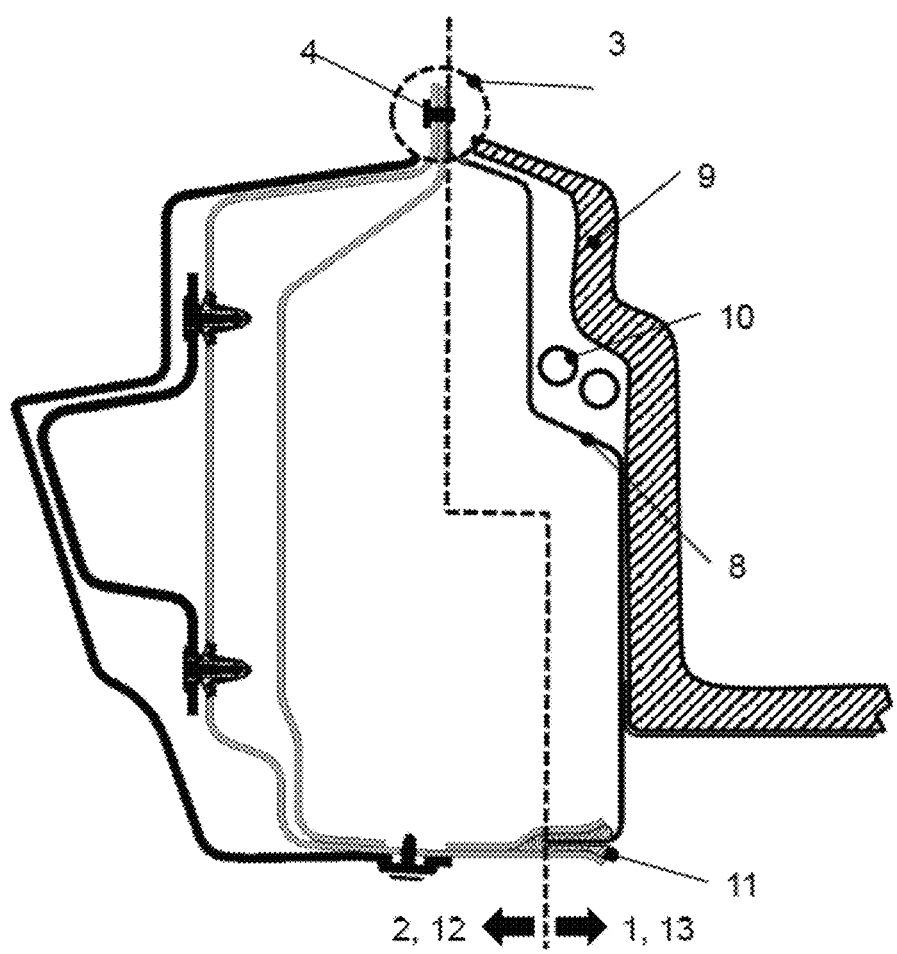
FIG. 1 illustrates a sectional view of a connection produced between a substructure and a side wall module of the body module, in accordance with embodiments.

As illustrated in FIG. 1, a sectional view of a connection produced between a substructure 1, illustrated on the right of the dashed line, and a side wall module as the body module 2, illustrated on the left of the dashed line. The substructure 1 has a floor 8 with a carpet 9. Electric lines 10 are arranged between carpet 9 and floor 8. The body module 2 is permanently connected at an end illustrated at the bottom in FIG. 1 to the substructure 1 by an adhesive bath 11. At the upper illustrated end of the substructure 1 and of the body module 2, the substructure 1 and the body module 2 each have flange regions 3 which are connected by a solid punch rivet 4. A head of the solid punch rivet 4 lies here on the body module 2, and therefore, in a wet compartment 12, as illustrated in FIGS. 2 and 3.

Figure 2:
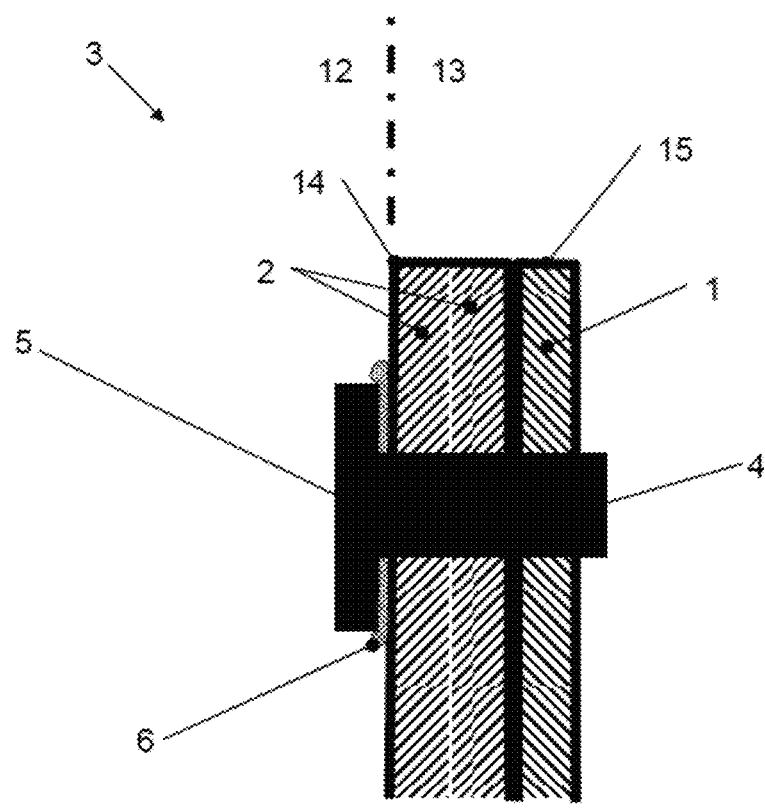
FIG. 2 illustrates a detailed illustration of the connecting region according to a dashed circle of FIG. 1, in accordance with embodiments.

FIG. 2 is a detailed illustration of the flange region 3 according to a dashed line in FIG. 1 in a first embodiment. The solid punch rivet 4 has a head 5 with an under head coating 6, and therefore, the under head coating 6 bears in the wet compartment 12 against the painted flange region 3 on the body module 2. The body module 2 is formed here by a welded assemblage, which is formed from two metal sheets, with a cathodic dip-painting (CDP) coating and a topcoat structure 14. The substructure 1 is formed by an individual metal sheet with a CDP coating 15.

Figure 3:
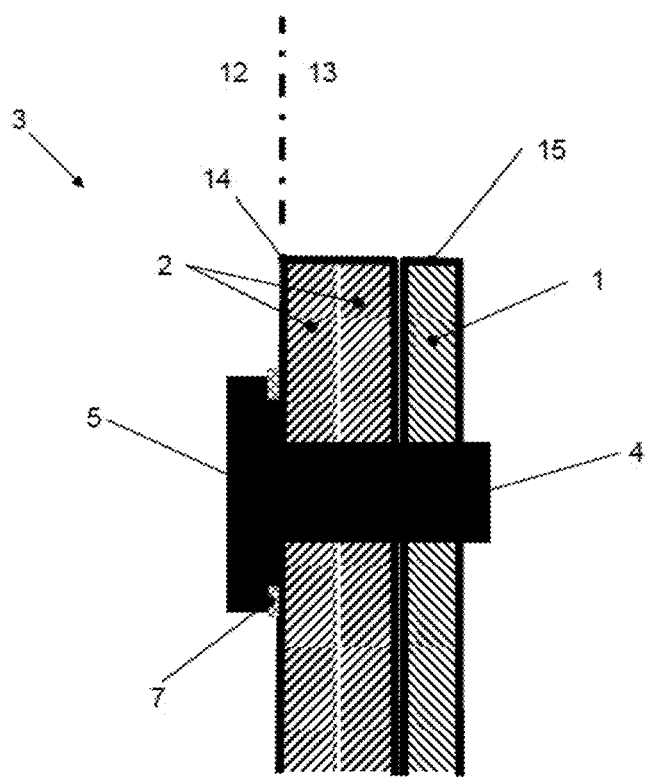
FIG. 3 illustrates a detailed illustration of the connecting region according to the dashed circle in FIG. 1, in accordance with embodiments.

FIG. 3 is a detailed illustration of an alternative embodiment of FIG. 2. In contrast to FIG. 2, instead of the under head coating 6 for sealing off and sealing on the part of the wet compartment 12, use is made of an under head seal 7 for the solid punch rivet 4. The under head seal 7 is formed by an annular seal encircling radially on the outside. The seal is incorporated into a radially encircling groove in the head 5.

Figure 4:
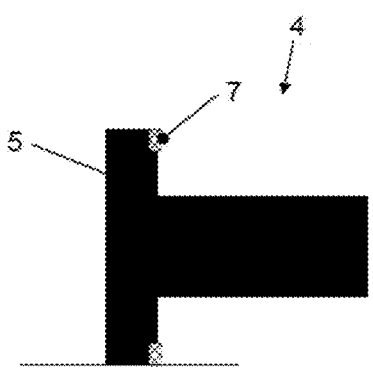
FIG. 4 illustrates a solid punch rivet of FIG. 3 before the setting, in accordance with embodiments.

FIG. 4 is an illustration which shows a solid punch rivet of FIG. 3 before the setting. Before the setting the seal ends flush at the outside diameter of the head 5, and therefore an interference-free automatic feeding of the solid punch rivets in a setting appliance is made possible.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

| | |
|---|---|
| 1 | Substructure |
| 2 | Body module |
| 3 | Flange region |
| 4 | Solid punch rivet |
| 5 | Head |
| 6 | Under head coating |
| 7 | Under head seal |
| 8 | Floor |
| 9 | Carpet |
| 10 | Electric lines |
| 11 | Adhesive bath |
| 12 | Wet compartment |
| 13 | Dry compartment |
| 14 | CDP (cathodic dip-painting) coating and topcoat structure |
| 15 | CDP coating |

What is claimed is:

1. A method for manufacturing a motor vehicle, comprising:
    producing a substructure and at least one body module, the substructure and the body module each having at least one flange region;
    painting at least the flange region of the substructure and/or of the body module; and
    connecting, via solid punch rivets, the flange regions of the substructure and the body module, the solid punch rivets each having a head with an under head coating or an under head seal, that bears against the painted flange region of the substructure or the body module.

2. The method of claim 1, wherein the under head coating comprises a thermoplastic coating.

3. The method of claim 1, wherein connecting the flange regions of the substructure and the body module comprises setting the solid punch rivets from a wet compartment side in a direction of a dry compartment side.

4. The method of claim 1, wherein the under head seal is formed by an annular seal encircling radially on the outside.

5. The method of claim 4, wherein the seal terminates flush at an outside diameter of the head, at least before setting the respective solid punch rivet.

6. The method of claim 4, wherein the seal is incorporated into a groove in the head.

7. A method for manufacturing a motor vehicle, comprising:
    producing a substructure and at least one body module, the substructure and the body module each having at least one flange region;
    painting at least the flange region of the substructure and/or of the body module;
    connecting, via solid punch rivets, the flange regions of the substructure and the body module, the solid punch rivets each having a head with an under head coating or an under head seal, that bears against the painted flange region of the substructure or the body module; and
    additionally connecting, via adhesive bonding and/or screwing, the substructure and the body module.

8. A motor vehicle, comprising:
    a substructure having at least one painted flange region; and
    at least one body module having at least one painted flange region;
    solid punch rivets to connect the substructure and the at least one body module at the respective at least one painted flange regions, the solid punch rivets each having a head with an under head coating or under head seal that bears against the at least one painted flange region of the substructure or the at least one body module.

9. The motor vehicle of claim 8, wherein the under head coating comprises a thermoplastic coating.

10. The motor vehicle of claim 8, wherein the solid punch rivets are set from a wet compartment side in the direction of a dry compartment side.

11. The motor vehicle of claim 8, wherein the under head seal is formed by an annular seal radially encircling the the solid punch rivet.

12. The motor vehicle of claim 11, wherein the seal terminates flush at the outside diameter of the head.

13. The motor vehicle of claim 11, wherein the seal is incorporated into a groove in the head.

14. The motor vehicle of claim 8, wherein the substructure and the body module are additionally connected by adhesive and/or screws.

\* \* \* \* \*